United States Patent
Kiermeier

Patent Number: 5,864,211
Date of Patent: Jan. 26, 1999

[54] CIRCUIT FOR OPERATING INCANDESCENT BULBS WITH AN OVERLOAD DETECTOR CIRCUIT

[75] Inventor: Theodor Kiermeier, Munich, Germany

[73] Assignee: Patent-Treuhand-Gesellschaft fuer elektrische Gluehlampen mbH, Munich, Germany

[21] Appl. No.: 915,523

[22] Filed: Aug. 15, 1997

[30] Foreign Application Priority Data

Aug. 19, 1996 [DE] Germany .......................... 196 33 372.5

[51] Int. Cl.[6] .................................................. H05B 39/04
[52] U.S. Cl. ........................................... 315/127; 315/225
[58] Field of Search .................................. 315/119, 127, 315/225

[56] References Cited

U.S. PATENT DOCUMENTS 5,740,021  4/1998  Lecheler et al. ......................... 315/224

FOREIGN PATENT DOCUMENTS

| | | |
|---|---|---|
| 0647084A1 | 4/1995 | European Pat. Off. . |
| 4242120A1 | 3/1994 | Germany . |
| 4310513C1 | 6/1994 | Germany . |
| 4333610A1 | 4/1995 | Germany . |
| 4117505C2 | 7/1995 | Germany . |

*Primary Examiner*—Robert Pascal
*Assistant Examiner*—Justin P. Bettendorf
*Attorney, Agent, or Firm*—Carlo S. Bessone

[57] ABSTRACT

A circuit arrangement for operating electrical incandescent bulbs, particularly low-volt halogen incandescent bulbs, comprises an inverter in the half-bridge circuit and an overload detector circuit, which comprises a current-voltage transformer, e.g., a resistance (R4), which is serially connected between first half-bridge capacitor (C3) and ground potential. The current-voltage transformer controls a signal-conditioning and cutoff circuit (R5–R7, C4, C5, D4, T3), which disconnects the inverter at least temporarily in the case of overload or short circuit. Preferably, current-voltage transformer (R4) of the overload detector circuit is a component of a frequency adaptation circuit (L1, R4), which opposes a decrease in the frequency of the inverter in the upper power connection range. This variant is particularly cost-favorable, since in this case, no additional component is required for detector circuit (R4).

10 Claims, 2 Drawing Sheets

CIRCUIT FOR OPERATING INCANDESCENT BULBS WITH AN OVERLOAD DETECTOR CIRCUIT

BACKGROUND OF THE INVENTION

The invention concerns circuit arrangements for operating electrical incandescent bulbs, particularly low-volt halogen incandescent bulbs.

This type of circuit arrangement contains as principal component a self-starting current-feedback inverter in half-bridge circuit, which chops the low-frequency mains voltage or d.c. voltage of the electrical supply into a high-frequency voltage. This voltage is then transformed by means of a power transformer to the low voltage of the halogen incandescent bulbs that are used, for example, usually to 6, 12 or 24 V. Such circuit arrangements are thus called electronic transformers or electronic converters. A detailed explanation of the functioning of electronic converters is disclosed, for example, in EP Patent 264,765 and DE-OS (Unexamined) 4,011,742.

A protective device is indispensable in order to prevent self-destruction of the circuit arrangement with a possible danger of fire as well as endangering of persons when an overload or short circuit occurs, i.e., when an inadmissible low-ohm load arises, for example, caused by parallel connection of several bulbs or by short circuiting of the bulb leads. For this purpose, a detector circuit is necessary, which supplies a suitable detection signal in the case of overload or short circuit. For brevity this circuit will be called the overload detector circuit in the following. The detection signal then serves as the control signal for a cutoff circuit, which disconnects the electronic converter at least temporarily.

After disconnection, the high-frequency oscillation of the inverter must be initiated again. Commonly, electronic converters contain a starting or triggering generator, which assumes this task. The electronic converter must be separated for a short time from the supply voltage. After a repeated application of the supply voltage, the inverter again oscillates.

A self-oscillating inverter in half-bridge circuit for a low-volt lamp with a protection circuit and a current measurement member is known from DE 42 42 120 A1. The current measurement member comprises essentially four resistors and a zener diode which is connected between the source of the lower half-bridge field effect transistor and the reference potential. A disadvantage of this solution is that the current measuring member requires a relatively large number of components. Also, the signal tapped from the resistance circuit for controlling the protective circuit is approximately proportional to the lamp current. In order to be able to distinguish at all between normal case and overload case, the protective circuit must be configured to have a very steep flank.

EP 0 647,084 A1 discloses a circuit arrangement with a self-starting half-bridge transformer and a detector circuit. The detector circuit comprises a serial connection of a diode and a resistance, which is connected in parallel to the bridge capacitor connected to ground potential. In addition, the bridge capacitors and the power transformer are dimensioned in such a way that the diode is conductive only when overload occurs. The serial resistance then transforms the current flowing through the diode into a voltage signal, which serves as a detection signal and controls a cutoff circuit. A disadvantage of this solution is the fact that the dimensioning of the half-bridge transformer must be fine-tuned to the detector circuit.

SUMMARY OF THE INVENTION

The task of the invention is to avoid this disadvantage and to provide a circuit arrangement, which reliably produces a detection signal, which controls a cutoff circuit, in the case of overload or short circuit, and which has as few components as possible and is thus cost-favorable.

The invention provides for specifically connecting an impedance operating as a current-voltage transformer, for example, a resistance, in series with a bridge capacitor. In this way, it is achieved that the charging or discharging current of the corresponding bridge capacitor flows through the current-voltage transformer in the oscillation cycle of the half-bridge transformer. The current-voltage transformer transforms this current signal into a voltage signal. This voltage signal is used for controlling a cutoff circuit. For this purpose, the current-voltage transformer is connected to the cutoff circuit of the electronic converter. By suitable dimensioning of the current-voltage transformer, the cutoff circuit will disconnect the inverter at least temporarily in the case of overload or short circuit.

In a simple embodiment, a resistance is connected between the first bridge capacitor connected to the reference potential, e.g., the minus pole of the inverter, and the reference potential. In this way, a voltage signal proportional to the load current through this first bridge capacitor can be tapped between the reference potential and the connection point of the first bridge capacitor and resistance, and this voltage signal is used as the detection signal. For this purpose, the connection point is contacted with the cutoff circuit. This solution is particularly cost-favorable, since the detector circuit only requires an additional resistance.

The value of the resistance lies in the range between approximately 0.1 Ω and 10 Ω, preferably in the range between approximately 0.3 Ω and 3 Ω. With respect to a particularly compact circuit arrangement, the resistance is preferably executed by SMD (Surface Mounted Device) technology.

In an advantageous embodiment of an inverter with bipolar switching transistors, the current-voltage transformer is a component of the base circuit of one of the switching transistors, particularly of the switching transistor connected to the reference potential (ground). Preferably, the current-voltage transformer is the resistance in the serial circuit of resistance and choke connected in parallel to the base-emitter path, which has been disclosed in DE OS (Unexamined) 4,436,465. According to the instructions of DE OS 4,436,465, the connection point between the resistance and the choke is connected with the foot point of the bridge capacitor that is otherwise usually connected directly with the reference potential. This arrangement opposes a decrease of the operating frequency of the transformer in the upper nominal load range. The efficiently useful range of the power connection can be expanded in this way. The present invention now utilizes this resistance also as the current-voltage transformer for producing the detection signal. For this purpose, the connection point between resistance and choke is contacted with the cutoff circuit. This solution is particularly cost-favorable for electronic converters with a large nominal load range, for which the frequency adaptation circuit of DE-OS (unexamined) 4,436,465 is also provided. In this case, no additional electronic component is necessary for the detector circuit. Only an additional contacting between the connection point of the resistance and choke, on the one hand, and the cutoff circuit, on the other hand, must be produced.

The inductivity value of the choke lies in the range between approximately 1 $\mu$H and 100 $\mu$H, particularly in the range between approximately 10 μH and 30 μH. For a particularly compact circuit arrangement, the choke is preferably executed as a bar choke.

The cutoff circuit contains a cutoff component, for example, a switching transistor or a thyristor, and usually a signal-conditioning circuit for processing the detection signal. The electronic converter is disconnected, for example, by short-circuiting the control connection of a switch of the inverter or of the trigger generator by means of the cutoff element, as disclosed, e.g., in EP 0 647,084 A1.

BRIEF DESCRIPTION OF THE DRAWINGS

The invention will be explained in more detail on the basis of the following examples of embodiment. Here.

BEST MODE FOR CARRYING OUT THE INVENTION

Figure 1:
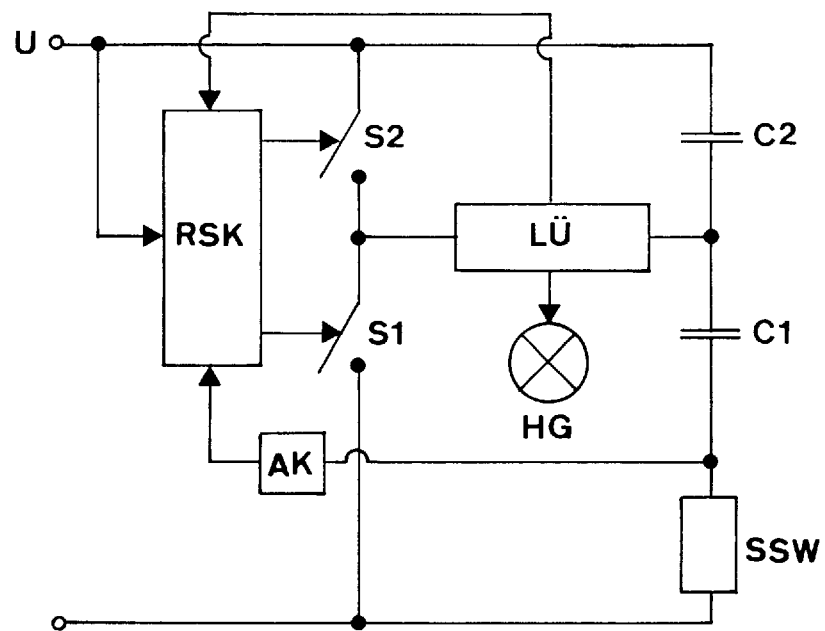
FIG. 1 shows a principle circuit diagram of an electronic converter with an overload detector circuit for the operation of low-volt halogen incandescent bulbs.

FIG. 1 shows a principle circuit diagram of an electronic converter according to the invention with an overload detector circuit for operating low-volt halogen incandescent bulbs HG. The converter is comprised of a half-bridge transformer, which is fed by supply voltage U and has two controllable bridge switches S1, S2, and two bridge capacitors C1, C2, a feedback and control circuit RSK for maintaining the high-frequency oscillation of the half-bridge transformer, which selectively controls bridge switches S1, S2, and if needed, it also may contain a trigger generator (not explicitly shown) for reoscillation of the half-bridge transformer, a power transformer LÜ, which is fed by the half-bridge transformer, and is connected on one side with a low-volt halogen incandescent bulb HG and on the other side is connected to feedback and control circuit RSK, a current-voltage transformer SSW, which represents the detector circuit itself and is connected in series to a bridge capacitor C1, and a cutoff circuit AK, whose input is connected to current-voltage transformer SSW and whose output is connected to feedback and control circuit RSK. The current-voltage transformer SSW produces a voltage signal, which controls cutoff circuit AK. In case of overload or short circuit, cutoff circuit AK operates directly on feedback and control circuit RSK such that it interrupts the oscillation of the half-bridge transformer.

Figure 2:
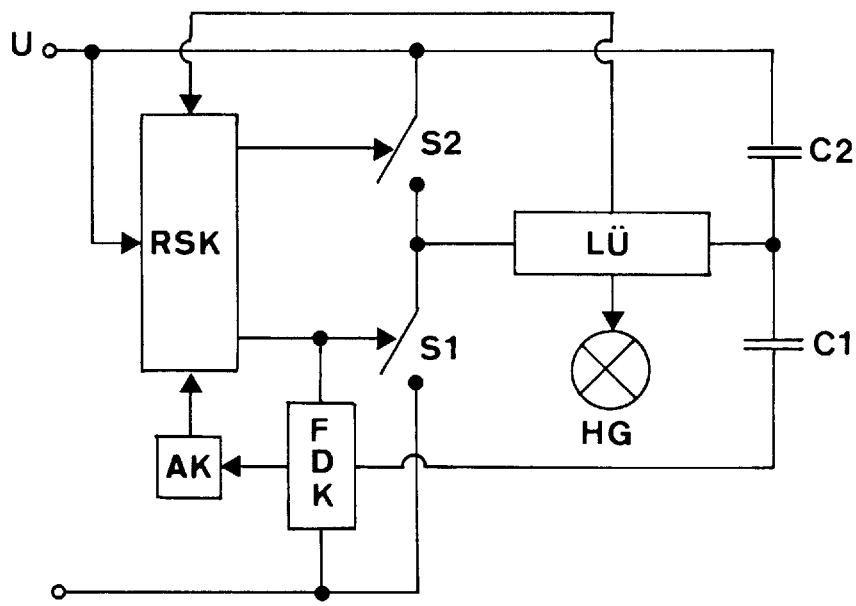
FIG. 2 shows a principle circuit diagram as in FIG. 1, but also with a frequency adaptation circuit.

FIG. 2 also shows a principle circuit diagram of an electronic converter according to the invention. In contrast to FIG. 1, this variant also contains a frequency adaptation circuit (not shown explicitly), which is completed by the current-voltage transformer of the detector circuit to form a frequency adaptation and detector circuit FDK. Frequency adaptation and detector circuit FDK is connected on one side with the control connection of a bridge switch S1 and opposes a decrease of the transformer frequency in the upper range of the power connection. On the other side, frequency adaptation and detector circuit FDK is connected to cutoff circuit AK and, corresponding to the functioning described in FIG. 1, causes an interruption of the oscillation of the half-bridge transformer in the case of overload or short circuit.

Figure 3:
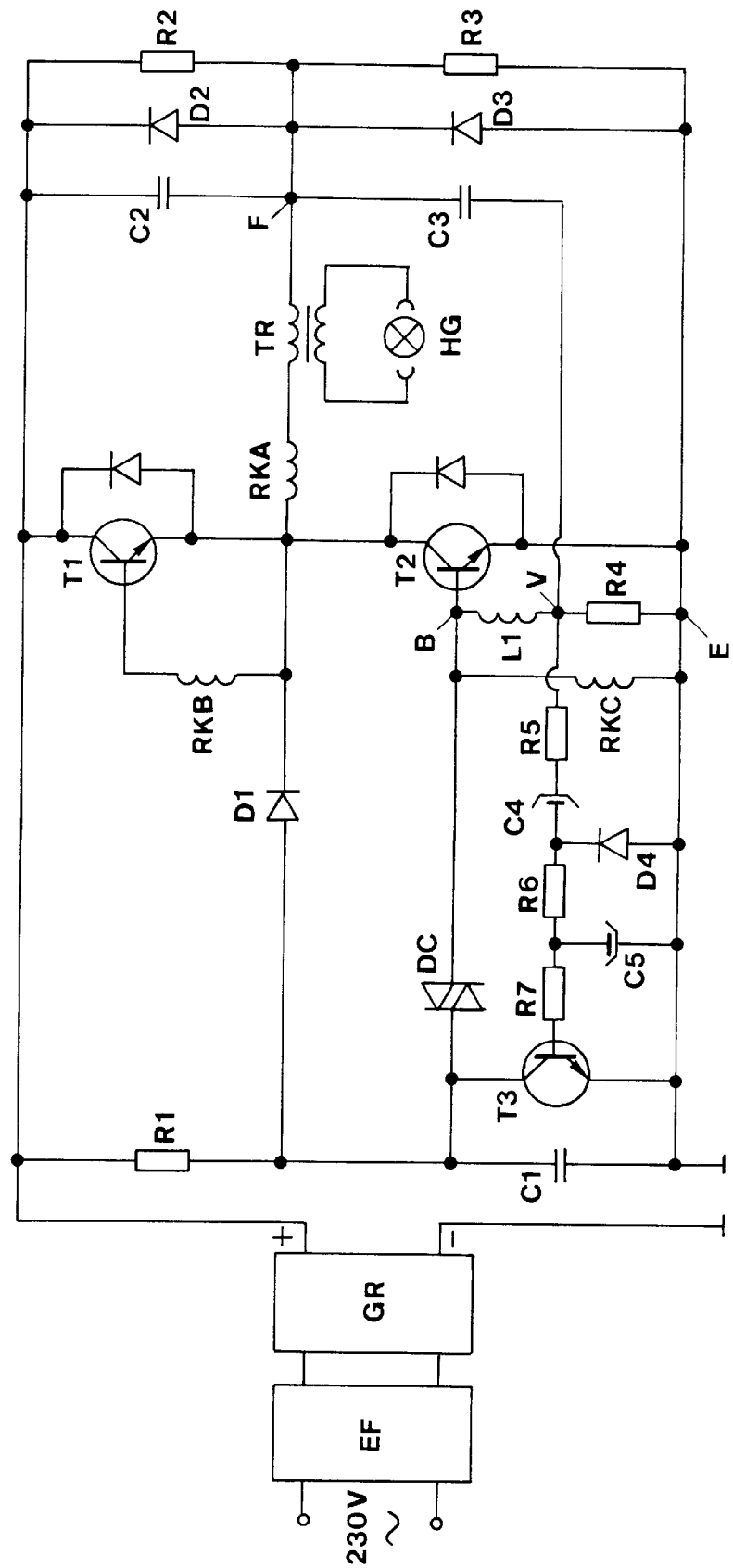
FIG. 3 shows an electrical circuit diagram of an electronic converter with an overload detector or protection circuit and with a frequency adaptation circuit for operating low-volt halogen incandescent bulbs.

FIG. 3 shows an electrical circuit diagram of an electronic converter according to the invention for operating low-volt halogen incandescent bulbs. The circuit arrangement contains, among other components, an overload detector circuit or an overload cutoff circuit as well as a frequency adaptation circuit and has the following features: an input filter (EF) for suppressing counter-cycle interference currents, a rectifier GR, whose minus pole is connected to the ground potential of the circuit, and is the reference potential in the following, a trigger generator, comprised of resistance R1, charging capacitor C1 and diac DC, a self-starting feedback half-bridge transformer—it essentially comprises two half-bridge transistors, T1, T2, half-bridge capacitor C2 and control transformer RKA-RKC for feedback—, a power transformer TR, at the secondary winding of which is operated a low-volt halogen incandescent bulb HG, a frequency adaptation circuit comprised of a serial connection of choke L1 and resistance R4 as well as branch capacitor C3, an overload detector circuit comprised of resistance R4 of the frequency adaptation circuit, which operates here in its second function as a current-voltage transformer for producing the detection signal, as well as a cutoff circuit with upstream-connected signal-conditioning circuit, comprised of an inverter circuit with resistance R5, capacitor C4 and diode D4, a retarding and holding component comprised of capacitors C4, C5 and the two resistances R6 and R7 as well as a cutoff transistor T3. A detailed explanation of the functioning of the signal-conditioning circuit or of the cutoff circuit is found in EP 0 647,084 A1.

In one variant, instead of the negative components, the positive components of the detection signal are used for control of the cutoff circuit. In this case, the signal-conditioning circuit does not contain an inverter circuit.

Branch capacitor C3 is contacted with the connection point V between choke L1 and resistance R4 on one side as well as foot point F of half-bridge capacitor C2 connected with the plus pole of the rectifier on the other side, and acts simultaneously as the second half-bridge capacitor. The connection of the serial circuit on the choke side is connected at point B with the base and the terminal on the resistance side is connected at point E with the emitter of half-bridge transistor T2 contacted by ground potential. A detailed explanation of the functioning of the frequency adaptation circuit is found in DE OS (unexamined) 4,436,465.

The design of the input filters is described, e.g., in H. J. Meyer, "Current supplies for practice", Vogel Book Publishers Würzburg, 1989, pages 115–116 (in German). The rectifier GR essentially comprises a diode full bridge (see e.g., W. Hirschmann and A. Hauenstein, "Switched-Mode Power Supplies", Siemens AG, 1990, p. 102 (in German)) and transforms the alternating voltage of the mains into a pulsating d.c. voltage+$U_B$.

What is claimed is:

1. A circuit arrangement for operating an electrical incandescent bulb, on an alternating-voltage network or a d.c. voltage source with
   a self-oscillating half-bridge transformer having two controllable half-bridge switches (T1, T2) and feedback by means of a control transformer (RKA-RKC),
   two half-bridge capacitors (C2, C3) each having a first side connected at a connection point (F),
   a power transformer (TR), whose primary winding is coupled on one side to control transformer (RKA-RKC) and on the other side is contacted with the connection point (F) of the two half-bridge capacitors (C2, C3) and an incandescent bulb (HG) is connected to its secondary winding, an overload detector circuit (SSW; R4), a cutoff circuit (AK; T3) connected to overload detector circuit (SSW; R4), which disconnects the half-bridge transformer at least temporarily in the case of overload or short circuit, is hereby characterized in that the overload detector circuit comprises a current-voltage transformer (SSW; R4) which is serially connected between a second side of a first capacitor (C3) of the two half-bridge capacitors (C2, C3) and the reference potential (−) of the half-bridge transformer, and that a connection point (V) between the second side of first half-bridge capacitor (C3) and current-voltage transformer (SSW; R4) is connected with cutoff circuit (AK; T3).

2. The circuit arrangement according to claim 1, further characterized in that current-voltage transformer (SSW) is an ohmic resistance (R4).

3. The circuit arrangement according to claim 2, further characterized in that resistance (R4) has a value in the range between approximately 0.1 Ω and 10 Ωn.

4. The circuit arrangement according to claim 3, further characterized in that the value of resistance (R4) lies in the range between approximately 0.3 Ω and 3 Ω.

5. The circuit arrangement according to claim 2, further characterized in that the circuit arrangement also contains a frequency adaptation circuit opposing a decrease of the transformer frequency in the upper range of the power connection, and this circuit comprises resistance (R4) and a choke (L1) also connected in series to the latter, whereby the connection of the serial circuit on the choke side is contacted with base (B) and the connection on the resistance side is contacted with emitter (E) of half-bridge transistor (T2) connected with reference potential (−), so that connection point (V) between choke (L1) and resistance (R2) is connected on one side with cutoff circuit (AK) and on the other side with first half-bridge capacitor (C2).

6. The circuit arrangement according to claim 5, further characterized in that choke (L1) has a value in the range between approximately 1 $\mu$H and 100 $\mu$H.

7. The circuit arrangement according to claim 6, further characterized in that the value of choke (L1) lies in the range between approximately 10 $\mu$H and 30 $\mu$H.

8. The circuit arrangement according to claim 5, further characterized in that resistance (R4) is executed by SMD (Surface Mounted Device) technology and choke (L1) is executed as a bar-core choke.

9. The circuit arrangement according to claim 1, further characterized in that cutoff circuit (AK) contains a transistor (T3) as the cutoff component, and the transistor (T3) has a base connected with connection point (V) between first half-bridge capacitor (C3) and current-voltage transformer (SSW; R4).

10. The circuit arrangement according to claim 1, further characterized in that the two controllable half-bridge switches are transistors (T1, T2).

* * * * *